Patented Dec. 14, 1943

2,336,890

UNITED STATES PATENT OFFICE 2,336,890

GLYCOSIDES OF 2-ALKYL-1,4-NAPHTHO-HYDROQUINONE

Byron Riegel and Perrin G. Smith, Evanston, Ill., assignors to Abbott Laboratories, North Chicago, Ill., a corporation of Illinois No Drawing. Application November 27, 1939, Serial No. 306,294

8 Claims. (Cl. 260—210)

The present invention is directed to glycosides of 2-alkyl-1,4-naphthohydroquinone and in particular to water soluble antihemorrhagic substances.

The compounds of the present invention may be represented by the following formula:

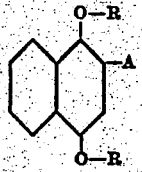

in which A represents an alkyl group such as methyl, ethyl, propyl, butyl, etc., and both R's represent like or unlike glycoside groups, such as glucoside, fructoside, etc., or one R represents a glycoside group and the other R represents hydrogen or an acyl group such as acetyl, etc. Where both R's are glycoside groups the compound is a di-glycoside and where one R only is a glycoside group the compound is a monoglycoside.

The following example of the preparation of a preferred compound of the present invention will serve for illustrative purposes.

Di-β-d-glucoside of 2-methyl-1,4-naphthohydroquinone

A mixture of about 3 grams of 2-methyl-1,4-naphthohydroquinone and 7.7 grams of β-d-glucose pentacetate with a catalyst, e. g., 0.15 gram of p-toluenesulfonic acid, is first heated and stirred at a temperature of about 130°–135° C. for about 30 minutes—during which period some acetic acid is evolved. The reaction product dissolved in 300 ml. of benzene is then washed with water, dilute alkali and again with water and the alkaline extract acidified with dilute acid, extracted with ether and the ether removed by evaporation. The alkali soluble residue resembling tar is small in amount and may be discarded. The benzene solution containing the alkali insoluble material is dried and the benzene removed under reduced pressure in the usual way. The dark colored syrup remaining is then taken up in ether, decolorized with carbon and the residue after evaporation of the ether crystallized from 95 per cent ethanol. The acetylated di-glucoside of 2-methyl-1,4-naphthohydroquinone obtained melts at about 208° C.

The hydrolysis of the acetylated di-glucoside obtained, for example, by the above described process may be carried out as follows: About 250 mg. of the acetylated glucoside is first mixed with 175 ml. of a filtered, aqueous, saturated solution of barium hydroxide, the mixture shaken at room temperature for about 8 hours and then allowed to stand for a total time of about 24 hours. The unreacted barium hydroxide is next precipitated as the carbonate (e. g., by treatment with $CO_2$), the mixture filtered in order to remove the water insoluble materials, and the resulting barium hydroxide-free solution evaporated around 35°–40° C. under reduced pressure. The solid residue containing unwanted barium acetate as well as the free glucoside is then extracted with several (e. g., 3) 30 ml. portions of boiling ethanol. The alcohol is then removed from the extract containing the desired glucoside and the residue finally crystallized from the water. The 2-methyl-1,4-naphthohydroquinone di-β-d-glucoside obtained has been found to have an antihemorrhagic activity as high as 500 Dann units per mg. when injected as an aqueous solution.

In the above example the process described therein is merely illustrative and the present invention is not limited thereto. Other methods for the preparation of glycosides or various modifications thereof may be employed if desired in the preparation of the naphthohydroquinone-glycosides of the present invention.

It will be understood that the present invention is not limited to the β-d-glycosides of the above example. The β-1 as well as the α-d and α-1 glycosides or mixtures of the same may be prepared by selecting the proper form of sugar. It will also be understood that the present invention is not limited to glycosides prepared from glucose. Other sugars suitable for use in the preparation of the glycosides of the present invention include monosaccharides, e. g., hexoses such as fructose, galactose, mannose, etc., pentoses such as arabinose, xylose, etc., and heptoses, etc., as well as the disaccharides such as maltose, lactose, etc. The aldo- and keto-saccharides are preferred for use in the preparation of the glycosides of the present invention—the sugars listed above being representative examples thereof.

In the above example both R's of the representative formula are like glycosides or glycosides of the same type. The mixed glycosides (i. e., where one R represents one type of glycoside such as glucoside and the other R represents another type of glycoside such as fructoside) may be prepared by employing a mixture of sugars selected in accordance with the type of glycoside desired.

In the above example both R's of the representative formula are glycosides and the resulting product is a di-glycoside. The mono-glycoside (i. e., where one R represents a glycoside and the other R represents hydrogen) may be prepared by employing the proper ratio of sugar and naphthohydroquinone. If the mono-glycoside derivative is prepared (it being understood that the glycoside group may be at the 1 or 4 position) it has been found desirable to protect the hydroxyl (OH) group by replacing the hydrogen with an acyl group such as acetyl in order to form an ester or acetate group.

The compounds of the present invention are stable and due to water solubility are readily administered in accordance with medical practices. Investigations indicate the 2-methyl-1,4-naphthohydroquinone-glyucosides to possess particularly high antihemorrhagic activity coupled with low toxicity when injected in aqueous solutions.

It will be understood that the present invention is not limited to the above illustrative examples. All modifications coming within the scope of the present invention are intended to be covered by the following claims.

We claim:

1. Glycosides of 2-alkyl-1,4-naphthohydroquinone, said glycosides being prepared as therapeutics and being characterized by antihemorrhagic activity.
2. Glycosides of 2-methyl-1,4-naphthohydroquinone, said glycosides being prepared as therapeutics and being characterized by antihemorrhagic activity.
3. Glucosides of 2-alkyl-1,4-naphthohydroquinone, said glucosides being prepared as therapeutics and being characterized by antihemorrhagic activity.
4. Di-glucosides of 2-methyl-1,4-naphthohydroquinone, said glucosides being prepared as therapeutics and being characterized by antihemorrhagic activity.
5. A compound represented by the formula:

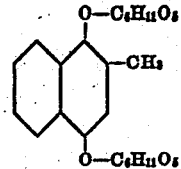

said compound being prepared as a therapeutic and being characterized by antihemorrhagic activity.

6. A compound represented by the formula

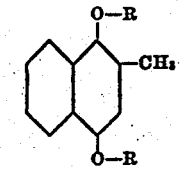

in which the R's represent glucoside groups, said compound being prepared as a therapeutic and being characterized by antihemorrhagic activity.

7. A compound represented by the formula of claim 6 in which the R's represent d-glucoside groups, said compound being prepared as a therapeutic and being characterized by antihemorrhagic activity.

8. A compound represented by the formula of claim 6 in which the R's represent β-d-glucoside groups, said compound being prepared as a therapeutic and being characterized by antihemorrhagic activity.

BRYON RIEGEL.
PERRIN G. SMITH.

CERTIFICATE OF CORRECTION.

Patent No. 2,336,890. December 14, 1943.
BYRON RIEGEL, ET AL.

It is hereby certified that error appears in the printed specification of the above numbered patent requiring correction as follows: Page 1, second column, line 17, after "from" strike out "the"; and that the said Letters Patent should be read with this correction therein that the same may conform to the record of the case in the Patent Office.

Signed and sealed this 29th day of February, A. D. 1944.

Leslie Frazer (Seal) Acting Commissioner of Patents.